United States Patent
van Holder et al.

(10) Patent No.: US 8,615,621 B2
(45) Date of Patent: Dec. 24, 2013

(54) MEMORY MANAGEMENT

(75) Inventors: Han van Holder, Singapore (SG); Charles Razzell, Pleasanton, CA (US); Lixin Liang, Singapore (SG); Chee Ee Lee, Singapore (SG); Jerome Tjia, Singapore (SG); Marcel van Roosmalen, Singapore (SG)

(73) Assignee: ST-Ericsson SA, Plan-les-Ouates (CH)

(\*) Notice: Subject to any disclaimer, the term of this patent is extended or adjusted under 35 U.S.C. 154(b) by 238 days.

(21) Appl. No.: 12/977,902

(22) Filed: Dec. 23, 2010

(65) Prior Publication Data

US 2011/0161543 A1 Jun. 30, 2011

Related U.S. Application Data

(60) Provisional application No. 61/290,151, filed on Dec. 24, 2009.

(51) Int. Cl.
*G06F 13/36* (2006.01)
*G06F 13/00* (2006.01)

(52) U.S. Cl.
USPC ........... 710/306; 710/308; 711/100; 711/103; 711/115

(58) Field of Classification Search
USPC .......................... 710/305–317; 711/103, 115
See application file for complete search history.

(56) References Cited

U.S. PATENT DOCUMENTS

| | | | | |
|---|---|---|---|---|
| 7,107,383 | B1 * | 9/2006 | Rajan | 710/306 |
| 7,631,126 | B2 * | 12/2009 | Barake et al. | 710/105 |
| 7,640,379 | B2 | 12/2009 | Ramsdale | |
| 7,895,387 | B1 * | 2/2011 | Khodabandehlou et al. | 710/316 |
| 7,986,962 | B2 * | 7/2011 | Liang et al. | 455/550.1 |
| 8,010,768 | B2 * | 8/2011 | Chen et al. | 711/170 |
| 8,090,894 | B1 * | 1/2012 | Khodabandehlou et al. | 710/313 |
| 8,112,571 | B1 * | 2/2012 | Letourneur | 710/311 |
| 8,150,452 | B2 * | 4/2012 | Liang | 455/550.1 |
| 8,230,160 | B2 * | 7/2012 | Yeh | 711/103 |
| 8,266,361 | B1 * | 9/2012 | Jikku et al. | 710/310 |
| 8,281,169 | B2 * | 10/2012 | Borras et al. | 713/322 |
| 8,315,269 | B1 * | 11/2012 | Rajamanickam et al. | 370/419 |
| 2005/0210195 | A1 | 9/2005 | Teicher et al. | |
| 2007/0136528 | A1 | 6/2007 | Hauck et al. | |
| 2008/0222365 | A1 | 9/2008 | Szewerenko et al. | |
| 2010/0250836 | A1 * | 9/2010 | Sokolov et al. | 711/103 |
| 2011/0145445 | A1 * | 6/2011 | Malamant et al. | 710/16 |
| 2011/0161530 | A1 * | 6/2011 | Pietri et al. | 710/14 |
| 2011/0225349 | A1 * | 9/2011 | Holbrook et al. | 711/103 |
| 2012/0066422 | A1 * | 3/2012 | Monks | 710/105 |

OTHER PUBLICATIONS

Cypress—"West Bridge Antioch USB/Mass Storage Peripheral Controller"; 20 pages, Dated Mar. 14, 2007.*

\* cited by examiner

*Primary Examiner* — Brian Misiura
(74) *Attorney, Agent, or Firm* — Coats & Bennett, P.L.L.C.

(57) ABSTRACT

An Accelerated Storage Controller (ASC) in an electronic device allows both conventional (slower) application processor to memory interfaces to be employed transparently to existing software, while also allowing software configuration to realize an accelerated storage architecture on demand. Some use cases for the electronic device do not require accelerated storage, and a bypass mode does not require any modification to existing software. Other use cases (such as fast download of multiple gigabytes of media) benefit from an accelerated storage architecture offloading transfer from the electronic device application processor, but could also work with the traditional processor to memory interface, at the cost of slower downloads. Embodiments of the present invention provide for both these possibilities in a software-configurable architecture. Furthermore, a number of other connectivity options are provided under software control to optimize performance and connectivity for different use case scenarios.

10 Claims, 6 Drawing Sheets

MEMORY MANAGEMENT

This application claims priority to U.S. Provisional Patent Application Ser. No. 61/290,151, titled "Memory Management System Supporting Both Direct and Managed Access to Local Storage Memory," filed Dec. 24, 2009.

BACKGROUND

The Universal Serial Bus (USB) is a specification to establish communication between devices and a host controller. Originally designed for personal computers, the USB is intended to replace many varieties of serial and parallel ports. For example, USB connects many computer peripherals such as mice, keyboards, digital cameras, printers, personal media players, flash drives, external hard drives, and the like. Although designed for personal computers, USB has found application in a broad variety of other data communication contexts.

The USB has evolved through three major revisions, and several minor ones. The USB 1.0 specification, introduced in 1996, supported a data transfer rate of 1.5 Mbit/s, now referred to as "low speed." USB 1.1 introduced a "full speed" data transfer rate of 12 Mbit/s. USB 2.0, introduced in 2001, features a "hi-speed" rate of 480 Mbit/s. The USB 3.0 specification was released in late 2008, with controller chips available in early 2009. USB 3.0 defines a SuperSpeed data rate of 4.8 Gbit/s.

Flash memory is a non-volatile, solid state, digital data storage medium. Technically a type of EEPROM, NAND type flash (the most commercially common form of flash memory) is not usually byte-programmable, but must be read, written, and erased on a block basis. Additionally, wear leveling (dynamically remapping the physical memory to evenly spread physical write/erase cycle stress), bad block mapping, and other functions unique to NAND flash memory often require a dedicated controller for mass storage devices utilizing NAND flash as a storage medium.

The MultiMedia Card (MMC) is a flash memory card standard that defines the physical dimensions and operational characteristics of a small, removable mass storage device employing NAND flash memory. Embedded MMC (eMMC) describes a memory architecture combining embedded NAND flash memory and a high-speed MMC controller in a standard package (e.g., integrated circuit). eMMC simplifies system design by freeing a system processor from low-level flash memory management tasks. SD/MMC (Secure Digital) is another standard for removable memory based on the MMC form factor, which also combines flash memory with a memory controller. The SD controller provides Digital Rights Management (DRM) support. eMMC memory and SD/MMC card slots are commonly designed into consumer electronic devices, such as digital cameras and mobile phones, as a means of data storage and transfer.

Electronic devices deployed in the field, such as mobile cellular telephones, music players, digital cameras, satellite navigation receivers, and the like, are increasingly used to carry and render large quantities of digital content such as music, photographs and movies. The increasing data storage capacities of eMMC memory and SD/MMC cards reflect this fact. Due to the ever-increasing capacity of these cards, there is a need to accelerate data transfers between external sources and the storage memory. This need for speedy transfers from outside the electronic device is best met when the mobile platform's embedded system controller, or application processor, does not have to act as a mediator between a fast external host and the storage memory (e.g., eMMC memory and SD/MMC flash memory cards). Optimum speed is achieved when an accelerated storage controller is able to offload the fast transfer activity from the application processor. This concept is often known as side-loading. However, this capability conventionally means that the electronic device's application processor can no longer directly access its embedded or removable memory, and must instead request access to the stored data through the accelerated storage handler to which the memory is directly connected.

Conventional electronic devices do not have the ability to access storage memory via an intermediate device, due to traditional hardware and software architectures being designed for direct memory access. However, hardware architectures that can benefit from accelerated data and file transfers from an external host computer would be advantageous.

SUMMARY

An Accelerated Storage Controller (ASC) in an electronic device allows both conventional (slower) application processor to memory interfaces to be employed transparently to existing software, while also allowing software configuration to realize an accelerated storage architecture on demand. Some use cases for the electronic device do not require accelerated storage, and a bypass mode does not require any modification to existing software. Other use cases (such as fast download of multiple gigabytes of media) benefit from an accelerated storage architecture offloading transfer from the electronic device application processor, but could also work with the traditional processor to memory interface, at the cost of slower downloads. Embodiments of the present invention provide for both these possibilities in a software-configurable architecture. Furthermore, a number of other connectivity options are provided under software control to optimize performance and connectivity for different use case scenarios.

One embodiment relates to an electronic device. This could be a portable device such as a mobile phone. The device includes a memory interface operative to provide mechanical and electrical connectivity to memory media. The device also includes a data communication bus connected to the memory interface, and an Application Processor Engine (APE) connected to the data communication bus. The APE is operative to execute application programs, and is further operative to write data to and read data from memory media connected to the memory interface via the data communication bus. The device further includes an Accelerated Storage Controller (ASC). The ASC includes a host port configurably connected to the data communication bus and a communication port operative to connect the ASC to an external host in data communication relationship. As used herein, the term "external host" does not, unless otherwise specified, imply a particular physical position relative to other elements comprised by ASC, but refers to the described feature of being operative to connect the ASC to an external host in data communication relationship. The ASC is configurably operative to transfer data between an external host and memory media connected to the memory interface, via the host port and the data communication bus. The ASC is further configurably operative to isolate the host port from the data communication bus to allow the APE to read and write memory media connected to the memory interface, via the data communication bus.

Another embodiment relates to a method of managing data transfers in an electronics device including an APE and ASC including a host port and a communication port, the APE and host port of the ASC both connected to a memory interface via a data communication bus. Data is transferred between the APE and memory media connected to the memory interface via the data communication bus. Data is also transferred between an external host connected to the communication port of the ASC and memory media connected to the memory interface via the host port of the ASC and the data communication bus.

DETAILED DESCRIPTION

Figure 1:
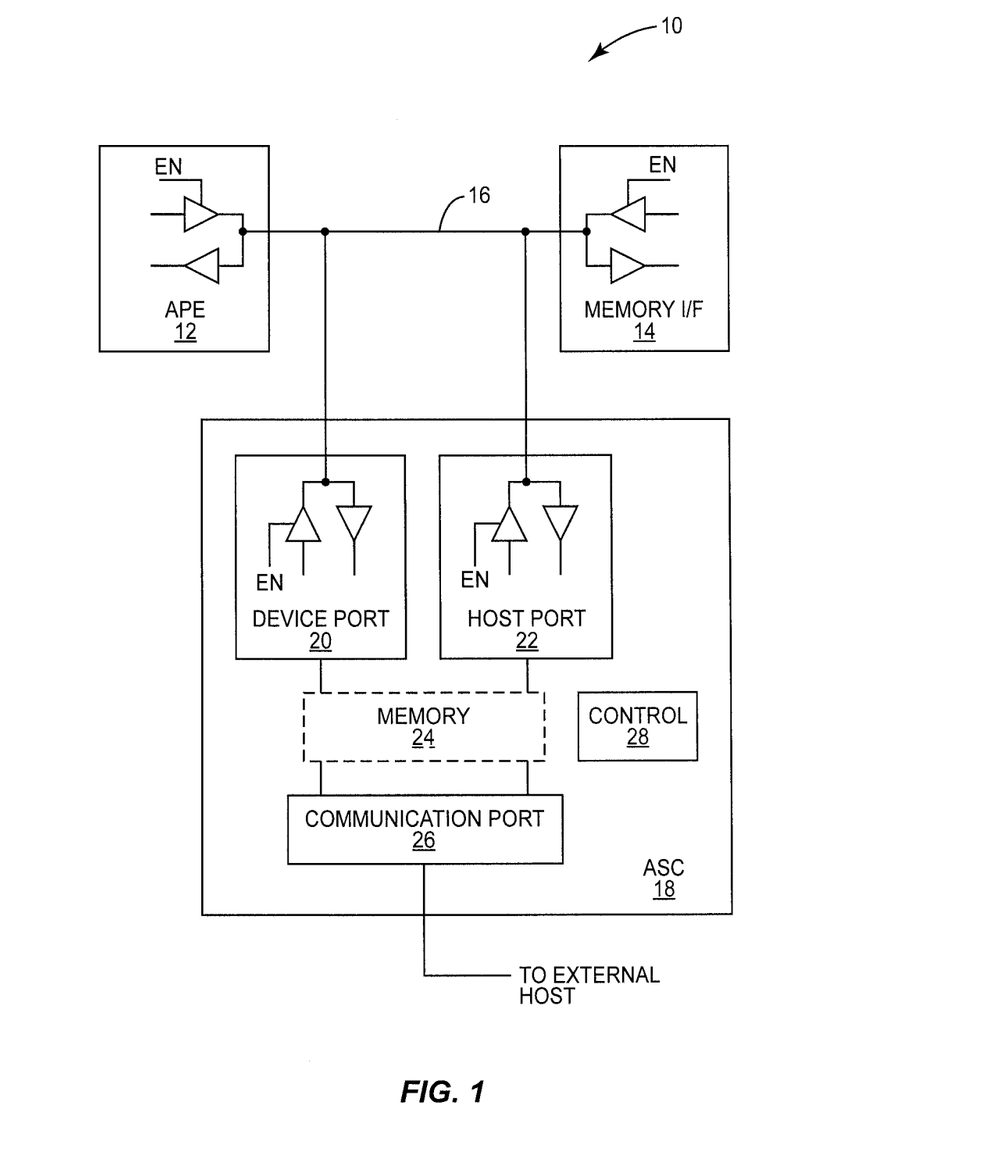
FIG. 1 is a functional block diagram of a representative data line of a communication bus between an Application Processor Engine (APE) and memory interface, with connection to an Accelerated Storage Controller (ASC).

FIG. 1 depicts a data path in an electronic device 10 including three of four entities, or functional blocks, between and among which data are transferred in an efficient way. Only the tri-state bus drivers of the entities are depicted (with separate enable signals, each labeled EN); the rest of the respective circuits are omitted for clarity. The electronic device 10 includes an Application Processor Engine (APE) 12 connected to a memory interface 14 via a data communication bus 16. While only a single line of the data communication bus 16 is depicted, those of skill in the art will recognize that the data communication bus 16 may comprise data and address lines, as well as various control lines such as clocks, read/write direction indicators, request/grant arbitration signals, and the like. The specific control lines will vary depending on the bus protocol implemented.

The APE 12 is a processor which may comprise a microprocessor, microcontroller, Digital Signal Processor (DSP), programmable logic with appropriate firmware, a state machine, or the like. The APE 12 is operative to execute operating system and/or embedded application programs to provide functionality to the electronic device 10 (e.g., mobile cellular telephone, digital camera, or the like). The memory interface 14 may comprise an interface to embedded memory media, such as eMMC, or may comprise a memory card slot operative to accept, and connect to, removable memory media such as SD/MMC. The APE 12 conventionally writes data to memory media connected to the memory interface 14, and reads data from the memory media, via the data communication bus 16, as known in the art.

FIG. 1 also depicts an Accelerated Storage Controller (ASC) 18. The ASC 18 includes at least a host port 22 connected to the data communication bus 16, and may additionally include a device port 20, also connected to the data communication bus 16. The ASC 18 may include memory 24 for buffering data transactions, and includes a communication port 26 operative to connect to an external host, such as, for example, a personal computer (PC), in a data communication relationship. In some embodiments, the communication port 26 is a USB port, and the external host connection is via a USB bus to a USB port on the external host. A controller 28, which may comprise a processor, state machine, or the like, is operative to control the various ports 20, 22, 26 under software control. In one embodiment, the controller 28 comprises a status register, the outputs of which are hardwired to various drivers, switches, and the like, and which controls operation of the ASC 18 by the status bits set by software, for example executing on the APE 12.

In one embodiment, the host port 22 and device port 20 implement USB host and USB device functionality, respectively. However, the present invention is not limited to such functionality. The device port 20 can be a "slave" port with respect to the data communication bus 16, and operative to accept and implement data transfer requests from the APE 12. For example, the APE 12 may write configuration data to the ASC 18, and/or may engage in handshaking or other protocol signaling with an external host via the USB interface 26, through the device port 20. Similarly, the host port 22 can be a "master" port with respect to the data communication bus 16, and operative to initiate and control data transfers to and from memory media connected to the memory interface 14. For example, an external host may transfer large amounts of data to and from the memory interface 14 via the host port 22 and communication port 26, without involving the APE 12.

In the embodiment depicted in FIG. 1, the APE 12, memory interface 14, device port 20, and host port 22 all connect to the data communication bus 16 with tri-state drivers. As is well known in the art, an entity not participating in a given bus transaction may be functionally removed from the bus by placing its tri-state drivers in a high impedance state.

Figure 2:
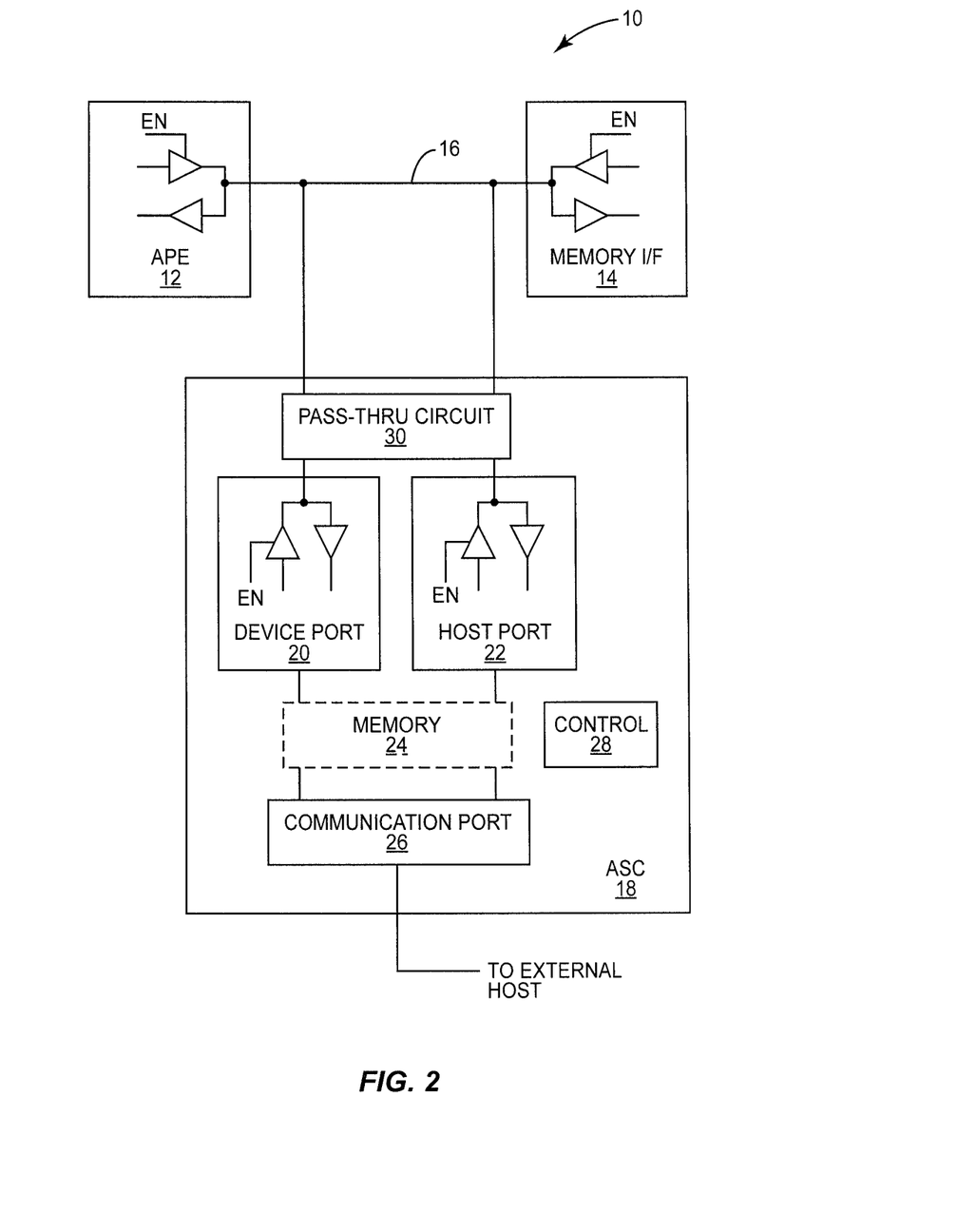
FIG. 2 is a functional block diagram depicting a representative data line of a communication bus between the APE and memory being routed through a pass-thru circuit of the ASC.

FIG. 2 depicts another embodiment of the electronic device 10, wherein a pass-thru circuit 30 of the ASC 18 is interposed on the data communication bus 16 between the APE 12 and the memory interface 14. The pass-thru circuit 30, as explained in greater detail herein, provides connectivity between the APE 12 and memory interface 14 in a pass-thru or bypass mode, and connect the APE 12 to the device port 20 and the host port 22 to the memory interface 14, in a non-pass-thru or non-bypass mode.

Several use cases, and their support and enablement by embodiments of the present invention, are discussed below. These specific use cases are explained to illuminate the advantages of the circuits and arrangements of embodiments of the present invention, and to provide an enabling disclosure. However, the present invention is not limited to any one, or even the sum of all, of the specifically delineated and described use cases discussed herein, but rather encompasses all embodiments and applications covered by the accompanying claims.

In implementing the use cases discussed below, either the APE 12 or the host port 22 of the ASC 18 (or both, in a time-multiplexed fashion) drive the control signals on the data communication bus 16 to perform bus transactions according to the data communication bus 16 protocol. That is, either the APE 12 or the host port 22 of the ASC 18 is an active master of the data communication bus 16. This can be implemented in numerous ways. In one embodiment, software configures the current bus master, such as by writing specific bits to control registers. In another embodiment, a bus arbitrator (not depicted in FIG. 1 or 2) may dynamically determine the bus master, with configuration software changing the relative arbitration priority of the APE 12 and host port 22 of the ASC 18. In either case, the present invention is extensible to include additional data communication bus 16 master and/or slave interfaces, as required or desired for particular implementations.

One important use case is access by the APE 12 to the memory interface 14. This is straightforward in the embodiment depicted in FIG. 1; the device port 20 and host port 22 of the ASC 18 are simply tri-stated, and take no part in the transactions across the data communication bus 16. In the embodiment depicted in FIG. 2, the pass-thru circuit 30 of the ASC 18 is in pass-thru or bypass mode, in which all the data communication bus 16 signals are routed through the pass-thru circuit 30, but no active intervention takes place. In either embodiment, application software executing on the APE 12 need not be aware of the ASC 18, and can access the memory interface 14 conventionally.

A second use case is access by the ASC 18 to the memory interface 14. For example, it may be required that an external entity (e.g., a PC having a USB 3.0 host interface) upload voluminous data, such as a movie, to embedded memory (e.g., eMMC) or a removable flash memory card (e.g., SD/MMC). Conventionally, the APE 12 would have to interface with the external host, accepting small amounts of data and writing them to the memory interface 14. According to one embodiment, the APE 12 is functionally disconnected from the data communication bus 16, and the host port 22 drives data transfers to/from the memory interface 14. The ASC 18 may accept data from an external host via the communication port 26, e.g., at USB 3.0 SuperSpeed data rates, and load the data directly into memory media connected to the memory interface 14. In one embodiment, buffer memory 24 facilitates such data transfer by decoupling the bus transactions on the data communication bus 16 (i.e., host port 22 to memory interface 14) from transactions received by the communication port 26. Of course, data may also be transferred from the memory interface 14 to an external host along the same path. In this use case, in the embodiment of FIG. 1, both the APE 12 and device port 20 of the ASC 18 are tri-stated and functionally removed from the data communication bus 16. In the embodiment of FIG. 2, the pass-thru circuit 30 of the ASC 18 is placed in non-pass-thru or non-bypass mode, in which the host port 22 is connected to the memory interface 14 (the APE 12 may also be connected to the device port 20 in such mode).

Figure 6:
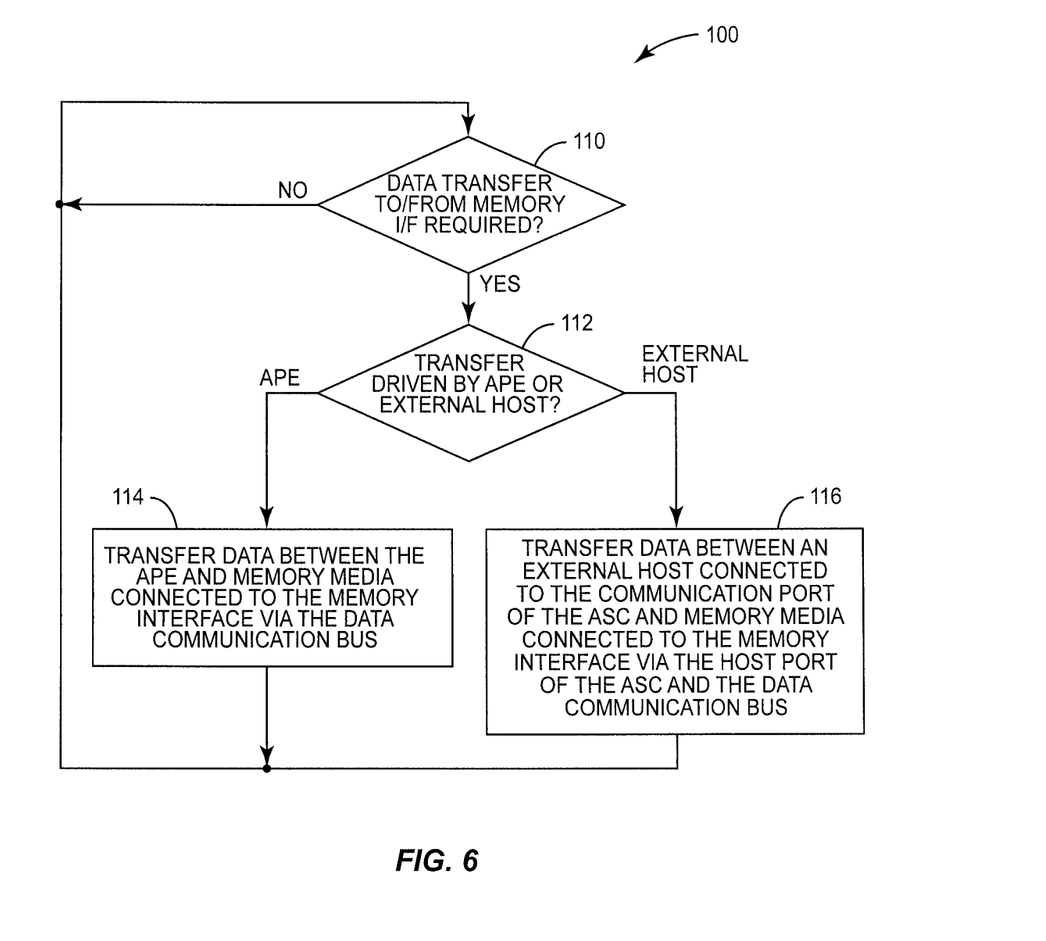
FIG. 6 is a flow diagram of a method of managing data transfers in an electronic device.

A method 100 of implementing, in the alternative, these two use cases by an electronic device 10, is depicted in FIG. 6. If a data transfer is required to or from the memory interface 14 (block 100), by either the APE 12 or an external host (block 112), then one of the two types of data transfer occurs across the data communication bus 16. In particular, if the APE requires access to the memory interface 14 (block 112), then data are transferred between the APE 12 and memory media connected to the memory interface 14, via the data communication bus 16 (block 114). This is the first use case described above. If an external host requires access to the memory interface 14 (block 112), then data are transferred between the external host connected to the communication port 26 of the ASC 18 and memory media connected to the memory interface 14, via the host port 22 and data communication bus 16 (block 116). This is the second use case described above. In either case, the memory media connected to the memory interface 14 may comprise embedded memory in the electronic device 10 (e.g., eMMC), or removable media (e.g., SD/MMC) removably inserted into a slot associated with the memory interface 14.

A third use case is access by the APE 12 to the ASC 18. For example, the APE 12 may configure the ASC 18 by writing control registers. As another example, the APE 12 may communicate with an external host via the communication port 26, such as by using USB 3.0 SuperSpeed data rates. Examples of cases in which the APE 12 of an electronic device implementing mobile cellular telephone functionality may need to communicate with software programs executing on an external PC include controlling Digital Rights Management (DRM) functions, calendar and address book synchronization, and providing cellular modem service to the PC. In this case, the APE 12 is the bus master; the device port 20 of the ASC 18 is the bus slave, and the host port 22 is functionally disconnected from the data communication bus 16. The memory interface 14 may for instance be logically disconnected from the bus, or in the case of an addressable bus, is simply not addressed for the APE 12 to ASC 18 transactions. In this use case, in the embodiment of FIG. 1, at least the host port 22 of the ASC 18, and possibly the memory interface 14 as well, are tri-stated and functionally removed from the data communication bus 16. In the embodiment of FIG. 2, the pass-thru circuit 30 of the ASC 18 is placed in non-pass-thru or non-bypass mode, in which the APE 12 is connected to the device port 20 (the host port 22 may also be connected to the memory interface 14 in such mode).

A fourth use case is "concurrent" access by the APE 12 to the ASC 18, and by the ASC 18 to the memory interface 14. The access is quasi-simultaneous—for example, implemented in a time-division multiplexing manner—since the data lines on the data communication bus 16 are shared. The quasi-simultaneous access may be implemented in a number of ways. For example, in one embodiment, configuration software simply alternately reconfigures the APE 12 and host port 22 to be active bus masters. In another embodiment, with a bus arbiter, the APE 12 and host port 22 may be given equal priority access, with the bus arbiter implementing a round-robin (or ping-pong) arbitration scheme. In yet another embodiment, access by the least-frequently using master may be interrupt driven. For example, the ASC 18 may transfer data to/from the memory interface 14, with the APE 12 providing, for example, DRM handshakes with the external host, or providing a USB enumeration response to the external host for some transfer classes. In this case, an access attempt by the APE 12 may cause the ASC 18 to provide an error response, and implement a "back off" of some predetermined duration, prior to initiating another data transfer on the data communication bus 16 to the memory interface 14.

Figure 3:
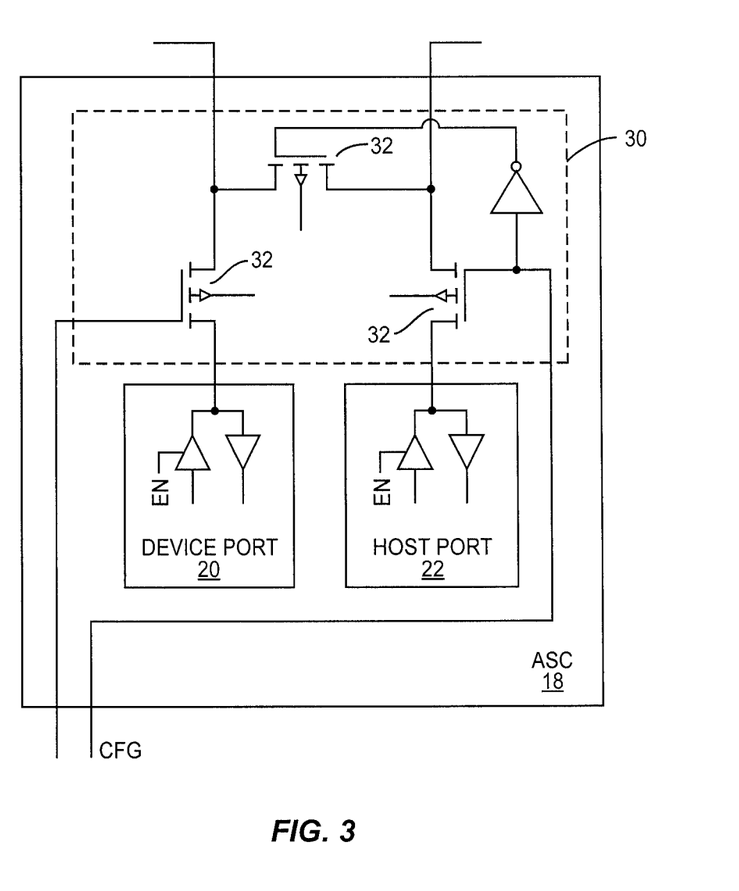
FIG. 3 is a functional block diagram of the pass-thru circuit of FIG. 2 implemented as analog switches.

FIG. 3 depicts one embodiment of the pass-thru circuit 30 of the ASC 18. In this embodiment, access to the memory interface 14 is provided to either the APE 12 or alternatively to the host port 22 of the ASC 18, by analog switches 32 routing the bus signals, depending on the state of configuration signals (CFG). The configuration signals may, for example, be driven by the controller 28. This embodiment offers the advantages of simplicity of design and a minimal hardware count, but imposes the limitation that the APE 12, memory interface 14, and ASC 18 must operate at the same voltage.

Figure 4:
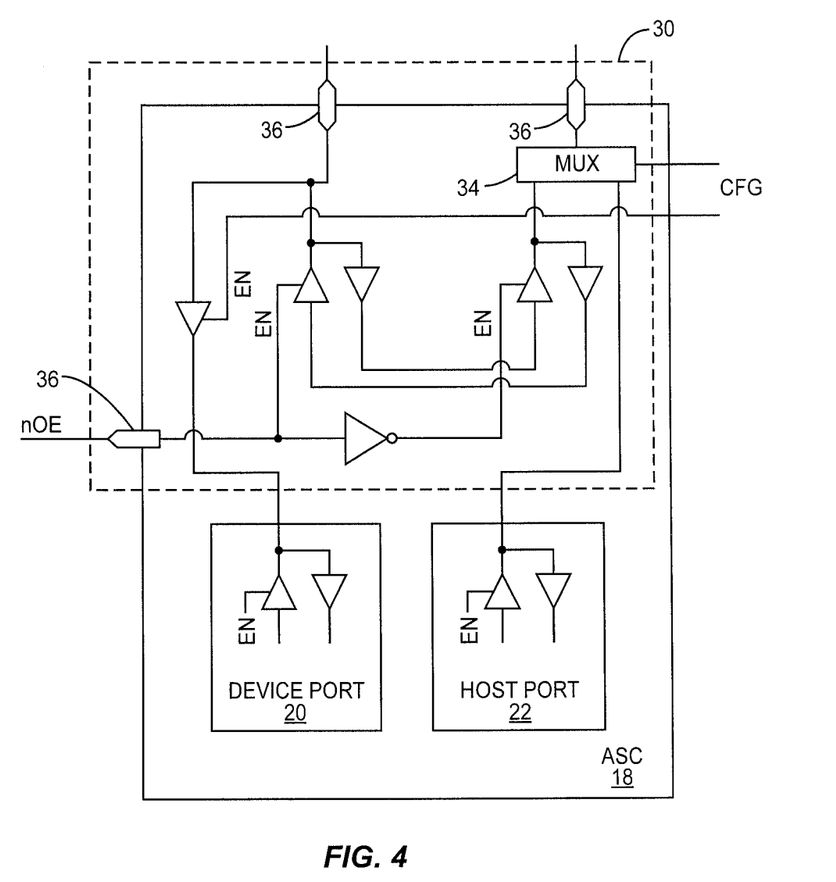
FIG. 4 is a functional block diagram of the pass-thru circuit of FIG. 2 implemented as digital circuits with an Output Enable input.

FIG. 4 depicts another embodiment of the pass-thru circuit 30 of the ASC 18, implemented with digital drivers and a multiplexor 34 routing the bus signals, again under the control of configuration signals (CFG). In this embodiment, an Output Enable (nOE) signal is provided by, e.g., the APE 12, indicating the direction of data transfer in pass-thru or bypass mode (i.e., APE-to-memory or memory-to-APE). This information is used to enable the proper drivers to implement the pass-thru circuit 30. Access to the memory interface 14 is provided to either the APE 12, or alternatively to the host port 22 of the ASC 18, by the state of the drivers under the control of the nOE signal, and the multiplexor 34, depending on the state of configuration signals (CFG). One advantage of this embodiment is that level shifters 36 may be employed to change the voltage level of bus signals, allowing the ASC 18 to operate at a different voltage level than the APE 12 and/or memory interface 14.

Figure 5:
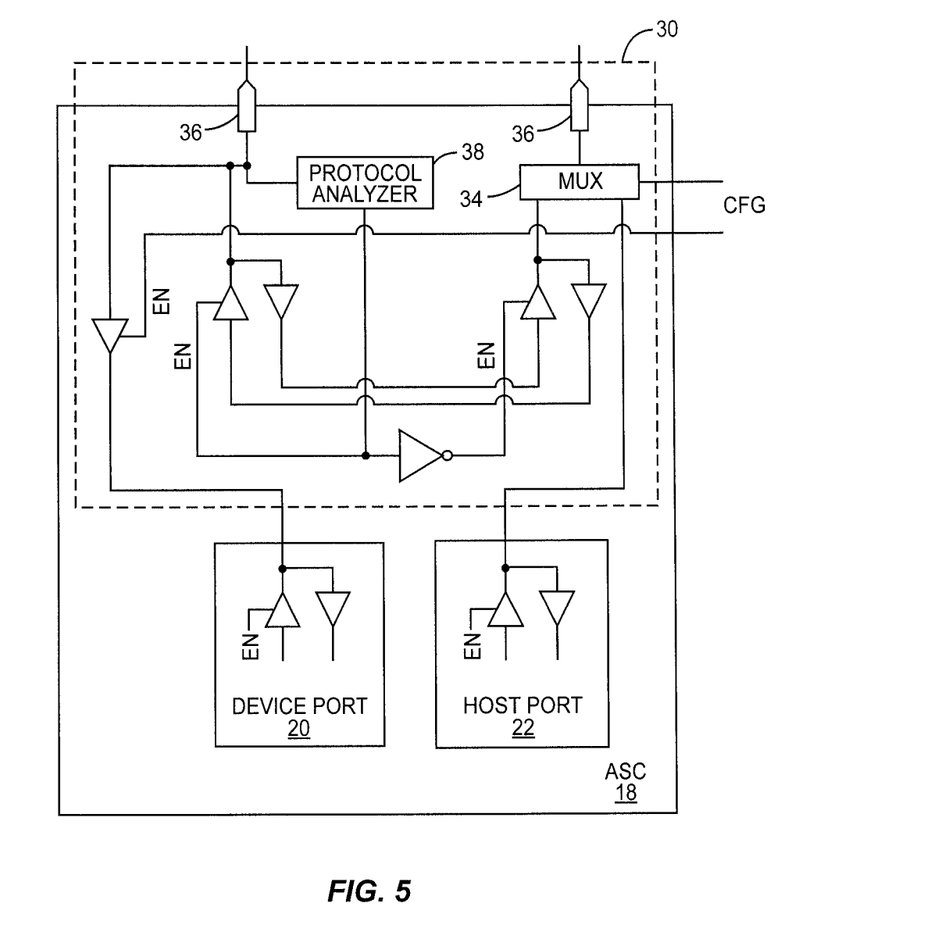
FIG. 5 is a functional block diagram of the pass-thru circuit of FIG. 2 implemented as digital circuits with a protocol analyzer to control the drivers.

FIG. 5 depicts a digital embodiment of the pass-thru circuit 30 of the ASC 18, in which the nOE signal is not available. Rather, a protocol analyzer monitors control signals on the data communication bus 16 to ascertain the direction of data transfer, and controls the drivers accordingly. Otherwise, this embodiment is similar to that of FIG. 4.

According to embodiments of the present invention, an external high-speed device, such as a PC, maintains a high-speed access to high volume data storage memory on an electronic device, when the electronic device application processor does not natively support such high-speed data transfer. Embodiments of the present invention are applicable to a wide variety of electronic devices, including cellular telephones, digital cameras, portable media players, digital video cameras, satellite navigation receivers, and the like.

eMMC is provided in this description as an example of embedded memory media accessed via the memory interface 16. Similarly, SD/MMC is described herein as an example of removable memory media removably connected to the memory interface 16. However, the present invention is not limited to these specific industry standard products. For example, embedded memory media may comprise any digital storage media having a controller/interface that presents a standard memory interface 14 to master devices on the data communication bus 16, such as the APE 12 and the host controller 22. Similarly, removable memory media may comprise any removable non-volatile memory media, such as MMC, Reduced-Size MMC (RS-MMC), Dual-Voltage MMC (DV-MMC), MMCplus, MMCmobile, MMCmicro, SecureMMC, SD, SDIO, miniSD, microSD, CompactFlash, USB flash memory drives, Memory Stick, SD High Capacity (SDHC), SD Extended Capacity (SDXC), or the like, as well as any revisions or extensions of these standards.

USB is provided in this description as an example of a communication host 26 protocol. However, the present invention is not limited to the USB bus protocol, or any of its specific versions or revisions. In general, the communication host 26 of the ASC 18 may implement any serial or parallel data communication protocol known in the art, including RS-232, RS-488, any version or release of the USB standard, any optical protocol, a custom or proprietary protocol, or any other data communication protocol operative to exchange data between the ASC 18 and an external host.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An electronic device, comprising:
   a memory interface operative to provide mechanical and electrical connectivity to memory media;
   a data communication bus connected to the memory interface;
   an Application Processor Engine (APE) connected to the data communication bus and operative to execute application programs, and further operative to write data to and read data from memory media, when connected to the memory interface via the data communication bus; and
   an Accelerated Storage Controller (ASC) comprising a device port configurably connected to the data communication bus;
   a host port configurably connected to the data communication bus; and
   a communication port operative to connect the ASC to an external host in data communication relationship;
   wherein the ASC is configurably operative to transfer data between an external host, when connected via the communication port, and memory media, when connected to the memory interface, via the host port and the data communication bus;
   wherein the ASC is further configurably operative to functionally disconnect the host port from the data communication bus to allow the APE to read data from and write data to memory media, when connected to the memory interface, via the data communication bus;
   wherein the APE is configurably operative to transfer data to and from the ASC via the data communication bus and the device port; and
   wherein the APE is further configurably operative to transfer data to and from an external host via the data communication bus, and the device port and communication port of the ASC.

2. The device of claim 1 wherein the APE is operative to transfer data to and from the ASC via the data communication bus and the device port, and the ASC is operative to transfer data to and from memory media, when connected to the memory interface, via the host port and the data communication bus.

3. The device of claim 2 wherein the APE and host port control the data communication bus in a time-division multiplexed manner.

4. The device of claim 1 wherein the ASC is interposed on the data communication bus between the APE and the memory interface, and wherein the ASC further comprises:
   a pass-thru circuit operative to configurably connect the data communication bus connected to the APE to the data communication bus connected to the memory interface in a pass-thru mode, and further operative to connect the data communication bus connected to the APE to the device port and to connect the data communication bus connected to the memory interface to the host port in a non-pass-thru mode.

5. The device of claim 1 wherein the ASC is interposed on the data communication bus between the APE and the memory interface, and wherein the ASC further comprises:
   a device port configurably connected to the data communication bus and wherein the APE is configurably operative to transfer data to and from the ASC via the data communication bus and the device port, and
   a pass-thru circuit operative to configurably functionally disconnect the APE from the memory interface and connect the host port to the data communication bus, whereby the host port can drive data transfers to/from the memory interface, and to configurably functionally connect the APE to the memory interface and functionally disconnect the host port and device port from the memory interface, thereby providing access for the APE to the memory interface.

6. The device of claim 5 wherein the pass-thru circuit comprises analog switches operative to configurably connect bus signals.

7. The device of claim 5 wherein the pass-thru circuit comprises tri-state drivers and digital multiplexers operative to configurably connect bus signals.

8. The device of claim 7 wherein the pass-thru circuit further comprises an Output Enable control signal input.

9. The device of claim 7 wherein the pass-thru circuit further comprises a protocol analyzer operative to monitor bus traffic and control the tri-state drivers.

10. The device of claim 7 wherein the ASC operates at a different voltage level than at least one of the APE and the memory interface, and wherein the pass-thru circuit further comprises level shifters operative to change the voltage levels of bus signals.

* * * * *